United States Patent
Barsness et al.

(10) Patent No.: US 8,818,987 B2
(45) Date of Patent: Aug. 26, 2014

(54) CONVERTING UNION COMMANDS TO UNION ALL COMMANDS

(75) Inventors: Eric L. Barsness, Pine Island, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 265 days.

(21) Appl. No.: 11/972,861

(22) Filed: Jan. 11, 2008

(65) Prior Publication Data

US 2009/0182705 A1  Jul. 16, 2009

(51) Int. Cl.
*G06F 17/30* (2006.01)
*G06F 7/00* (2006.01)

(52) U.S. Cl.
CPC .. *G06F 17/30* (2013.01); *G06F 7/00* (2013.01)
USPC .......................................... 707/713; 707/714

(58) Field of Classification Search
CPC .................... G06F 17/30424; G06F 17/30315; G06F 17/30592; G06F 17/30241; G06F 17/30483
USPC ............ 707/2, 3, 4, 5, 6, 104.1, 10, 100, 713, 707/714

See application file for complete search history.

(56) References Cited

U.S. PATENT DOCUMENTS

| | | | | |
|---|---|---|---|---|
| 5,590,319 | A * | 12/1996 | Cohen et al. | 1/1 |
| 5,894,311 | A * | 4/1999 | Jackson | 345/440 |
| 6,581,055 | B1 * | 6/2003 | Ziauddin et al. | 1/1 |
| 7,013,299 | B1 * | 3/2006 | Sherwood | 1/1 |
| 7,519,585 | B2 * | 4/2009 | Kenney et al. | 1/1 |
| 7,526,510 | B2 * | 4/2009 | Sherwood | 1/1 |
| 7,797,304 | B2 * | 9/2010 | Muralidhar et al. | 707/713 |
| 2005/0120001 | A1 * | 6/2005 | Yagoub et al. | 707/3 |
| 2005/0125427 | A1 * | 6/2005 | Dageville et al. | 707/100 |
| 2006/0064407 | A1 * | 3/2006 | Santosuosso | 707/3 |
| 2008/0208549 | A1 * | 8/2008 | Gaved et al. | 703/11 |

OTHER PUBLICATIONS

Oracle SQL Second Edition 2003 Pearson Education, Inc.*

* cited by examiner

*Primary Examiner* — Etienne Leroux
*Assistant Examiner* — Fariborz Khoshnoodi
(74) *Attorney, Agent, or Firm* — Dugan & Dugan, PC

(57) ABSTRACT

In one aspect, a method is provided. The method includes: (1) identifying in a query of a database a union command involving data in the database that is mutually exclusive; and (2) changing the union command to a union all command.

18 Claims, 4 Drawing Sheets

CONVERTING UNION COMMANDS TO UNION ALL COMMANDS

FIELD OF THE INVENTION

The present invention relates generally to databases and, more particularly, to methods and apparatus for converting union commands to union all commands.

BACKGROUND

Many databases are growing in size such that information (or data or records) that used to be all in one table may now be split into more than one table. Applications that may use this data may sometimes be written to join the data together using a command (e.g., an SQL command).

The SQL commands UNION ("union") and UNION ALL ("union all") may be used by applications using data to join data from multiple tables together. With the union command, only distinct data from the multiple tables may be joined. Inherent with the union command may be a filtering operation to filter out duplicate data in order to return only distinct data. With the union all command, all data from the multiple tables may be joined (e.g., the data from the multiple tables are joined without filtering).

SUMMARY OF THE INVENTION

In a first aspect of the invention, a method is provided. The method may include: (1) identifying in a query of a database a union command involving data in the database that is mutually exclusive; and (2) changing the union command to a union all command.

In a second aspect of the invention, a device is provided. The device may include: (1) a server including a database; and (2) logic, coupled to the server, and to: (a) identify in a query of the database a union command involving data in the database that is mutually exclusive; and (b) change the union command to a union all command.

In a third aspect of the invention, a database system is provided. The database system may include: (1) a server, including: (a) a database; and (b) historical data related to the database; (2) logic, coupled to the server, and to: (a) identify in a query of the database a union command involving data in the database that is mutually exclusive; and (b) change the union command to a union all command.

Other features and aspects of the present invention will become more fully apparent from the following detailed description, the appended claims and the accompanying drawings.

DETAILED DESCRIPTION

The joining together of data from multiple tables in some instances may be of data that is mutually exclusive and thus already distinct. As an example, data from a sales table may be joined together with data from a historical sales table. As another example, data from a table involving orders under $100 may be joined together with data from a table involving orders $100 and over. Using the SQL command union to join such mutually exclusive data may waste system resources as the filtering operation inherent in the union command is unnecessary as the data is already distinct.

Embodiments of the present invention provide methods and apparatus for converting union commands to union all commands. More specifically, intelligence may be added to a database engine, for example, such that a determination may be made when data being joined is mutually exclusive. When it is, a union statement may be converted to a union all statement. This may result in a query that runs significantly faster using less system resources and that returns resulting data as if a union statement had been used. In an embodiment, a determination may be made whether any constraints exist that would indicate that the data being joined is mutually exclusive. In an embodiment, the data to be joined may be examined and soft constraints may be created to determine if the data being joined is mutually exclusive. In an embodiment, the same approach may be used with a partitioned database. If a query is run on a partitioned database, there may be cases where a subset of the partitions may be converted to a union all command before combining the final data from all of the partitions together.

Figure 1:
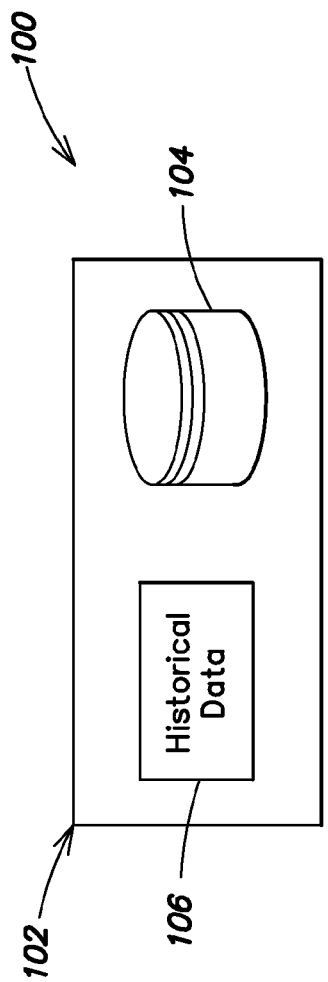
FIG. 1A is a block diagram of an exemplary database system in which the present methods and apparatus may be implemented.
FIG. 1B is a schematic representation of the historical data files 106 of FIG. 1A.

FIG. 1A is a block diagram of an exemplary database system 100, in which the present methods and apparatus may be implemented. The database system 100 may include a server 102 including a database 104 and historical data 106.

The database 104 may contain data in multiple tables. In an embodiment including a partitioned database, the partitioned database may contain data in multiple tables. FIG. 1B is a schematic representation of the historical data files 106 of FIG. 1A. The historical data 106 may include records including a query ID, partition IDs, an application ID, and a job ID. The historical data 106 may also include records including a query ID, union clauses, an application ID, and a job ID. The historical data files may record whether or not UNION queries resulted in duplicates being identified and removed, or if the data is (was) totally distinct.

Figure 2:
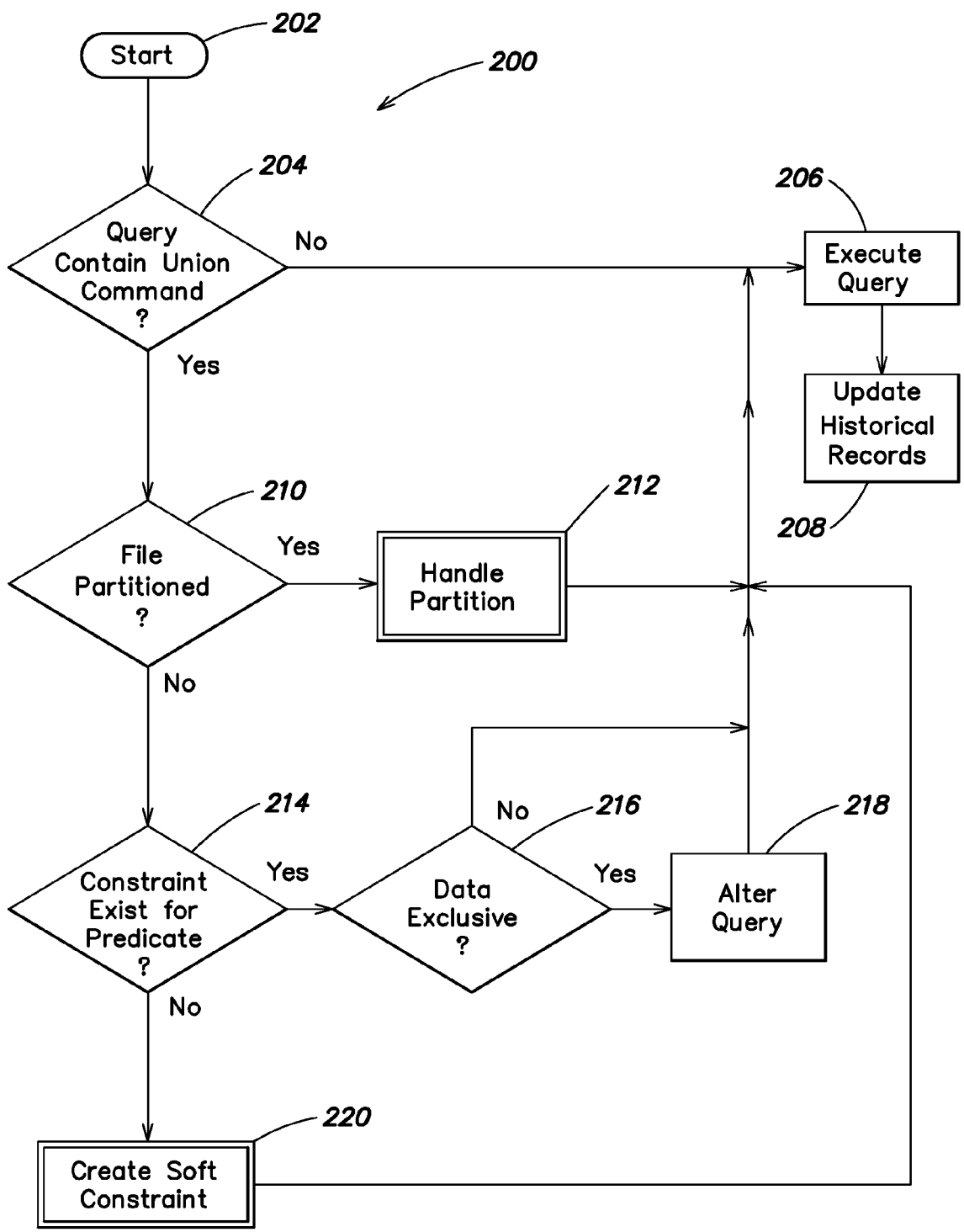
FIG. 2 illustrates an exemplary method for converting union commands to union all commands.

The operation of the database system 100 is now described with reference to FIGS. 2-4 which illustrate, inter alia, an exemplary method 200 for converting union commands to union all commands. With reference to FIG. 2, in operation 202, the method may start. In operation 204, a determination may be made whether a query of the database 104 contains a union command. If a decision is made in operation 204 that the query does not contain a union command, the method 200 may proceed to operation 206. In operation 206, the query may be executed and the method 200 may proceed to operation 208. In operation 208 the historical data files 106 may be updated. If a decision is made in operation 204 that the query does contain a union command, the method may proceed to operation 210. In operation 210, a determination may be made whether the file is partitioned. If a decision is made in operation 210 that the file is partitioned, the method 200 may proceed to operation 212. In operation 212, the partition may be handled, and the method 200 may proceed to operation 206. In operation 206, the query may be executed and the method 200 may proceed to operation 208. In operation 208 the historical data files 106 may be updated. If a decision is made in operation 210 that the file is not partition, the method 200 may precede to operation 214. In operation 214, a determination may be made whether a constraint exists for the predicate. If a decision is made in operation 214 that a constraint does exist for the predicate, the method may proceed to operation 216. If a decision is made in operation 214 that a constraint does not exist for the predicate, the method may proceed to operation 220, in which a soft constraint may be created. Soft constraints are known in the art and may used, for example, to speed up execution of queries such that additional predicate values may be added to a query to narrow down the searching of records. In operation 216, a determination may be made whether the data is exclusive. If a decision is made in operation 216 that the data is not exclusive, the method 200 may proceed to operation 206. If a decision is made in operation 216 that the data is exclusive, the method 200 may proceed to operation 218. In operation 218, the query may be altered to contain a union all command instead of a union command, and the method 200 may proceed to operation 206.

Figure 3:
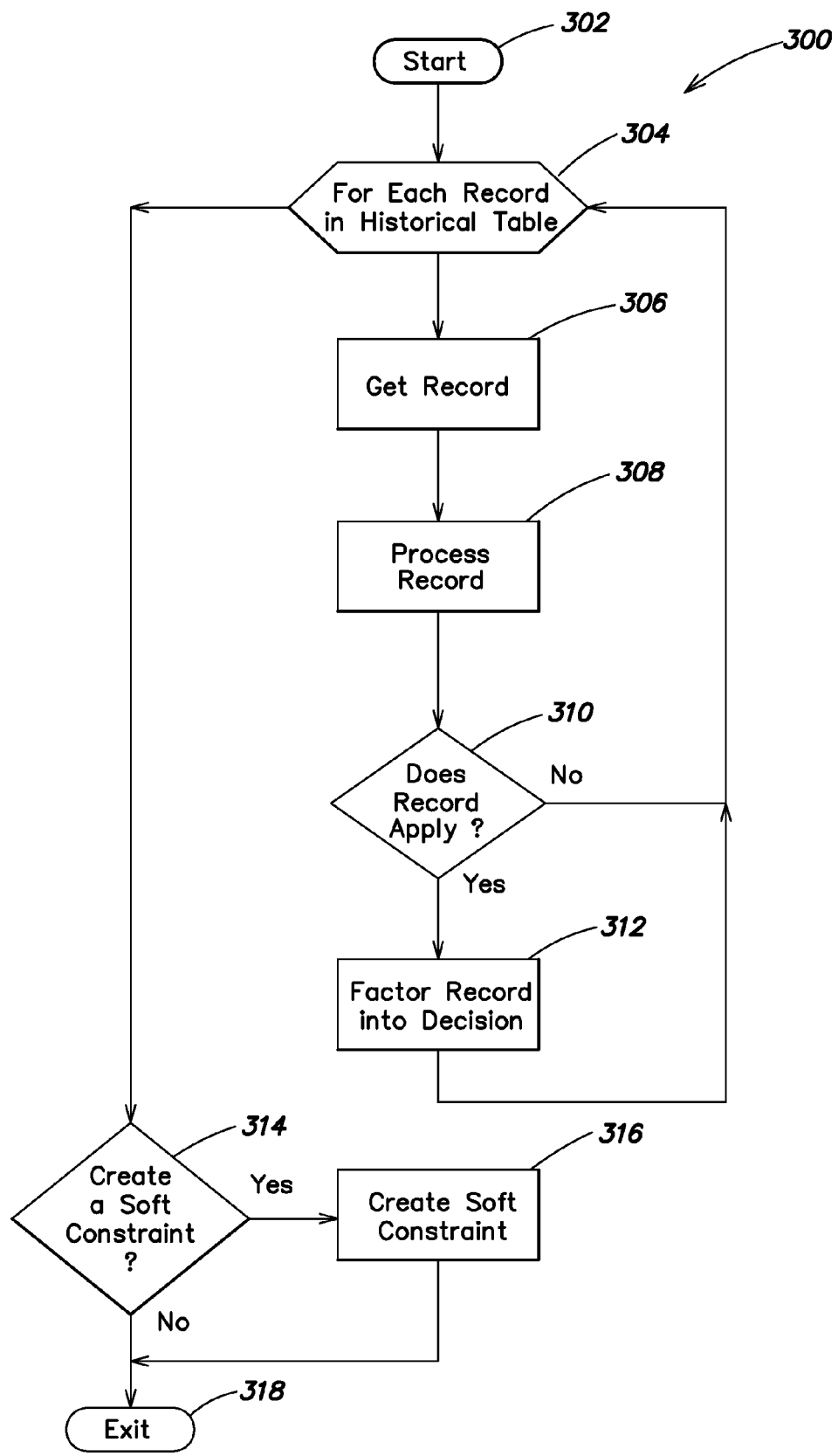
FIG. 3 illustrates an exemplary method of operation 220 of FIG. 2.

FIG. 3 illustrates an exemplary method 300 of operation 220 of FIG. 2. In operation 202, the method 300 may start. Operation 304 and subsequent operations may be repeated for each record (historical data 106) in a historical table. By reviewing historic execution of queries, those union statements that never remove duplicate records may be identified as candidates for a soft constraint. In an embodiment, a soft foreign key constraint may be created such that when records are added and removed, mutual exclusiveness may be checked. This mutual exclusiveness property could then be checked when a union statement is run again. Turning back to FIG. 3, in operation 306, a record may be retrieved. In operation 308, a record may be processed. In operation 310, a determination may be made whether the record applies. If a decision is made in operation 310 that the record applies, then the method may proceed to operation 312, in which the record may be factored into the determination made in operation 314, and the method may proceed to operation 314. If a decision is made in operation 310 that the record does not apply, then the method may proceed to operation 314. In operation 314, a determination may be made whether to create a soft constraint. If a decision is made in operation 314 to create a soft constraint, the method may proceed to operation 316. In operation 316, a soft constraint may be created, and the method may exit in operation 318. If a decision is made in operation 314 not to create a soft constraint, the method may exit in operation 318.

Figure 4:
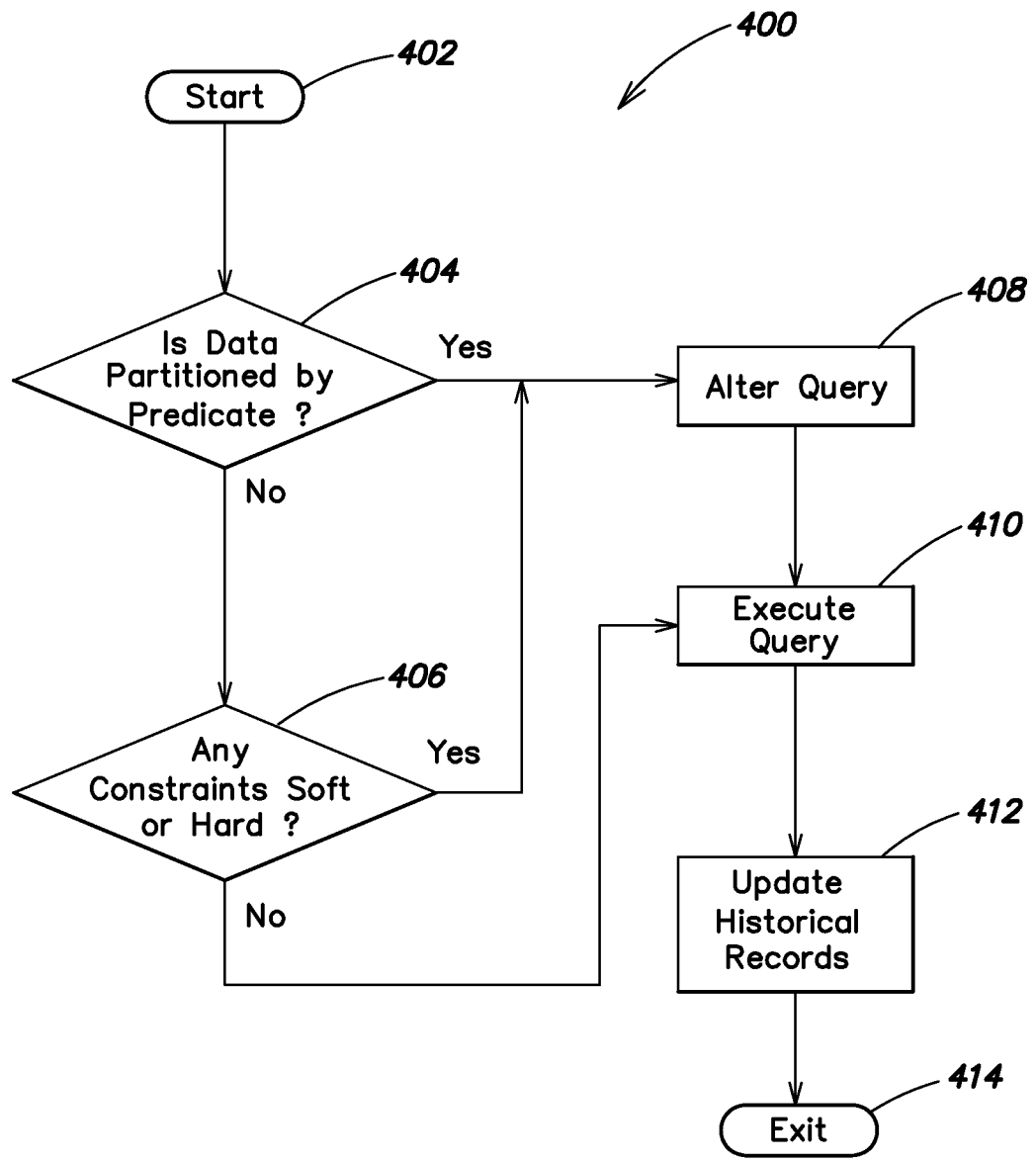
FIG. 4 illustrates an exemplary method of operation 212 of FIG. 2.

FIG. 4 illustrates an exemplary method 400 of operation 212 of FIG. 2. In operation 402, the method may start. In operation 404, a determination may be made whether data is partitioned by a predicate. If a decision is made in operation 404 that the data is partitioned by a predicate, the method may proceed to operation 408. In operation 408, the query may be altered, and the method 400 may proceed to operation 410. If a decision is made in operation 404 that the data is not partitioned by a predicate, the method may proceed to operation 406. In operation 406, a determination may be made whether any constraints (soft or hard) exist. If a decision is made in operation 406 that a constraint exists, the method 400 may proceed to operation 408, in which the query may be altered. If a decision is made in operation 406 that a constraint does not exist, the method 400 may proceed to operation 410. In operation 410, the query may be executed, and the method may proceed to operation 412. In operation 412, the historical data files 106 may be updated, and the method 400 may end in operation 414.

The foregoing description discloses only exemplary embodiments of the invention. Modifications of the above-disclosed embodiments of the present invention of which fall within the scope of the invention will be readily apparent to those of ordinary skill in the art. For instance, although in some embodiments, a server is discussed, the server may include any appropriate device, such as a cluster of nodes or a distributed database. Although in some embodiments, the database 104 and the historical data 106 are depicted as being separate, in other embodiments, the historical data 106 may be a part of the database 104.

Accordingly, while the present invention has been disclosed in connection with exemplary embodiments thereof, it should be understood that other embodiments may fall within the spirit and scope of the invention as defined by the following claims.

The invention claimed is:

1. A method, comprising:
identifying, in a query of a database, a union command involving data that includes a first data set and a second data set wherein the first data set and the second data set are mutually exclusive; and
improving performance of the query by changing the union command to a union all command,
wherein identifying a union command includes determining whether a definition of the data in the first data set excludes data in the second data set and determining whether the data includes a constraint for a predicate where the data is exclusive.

2. The method of claim 1, wherein the identifying in the query of the database the union command involving data in the database that is mutually exclusive comprises identifying a union command involving data from a partitioned file.

3. The method of claim 2, wherein the identifying the union command involving data from a partitioned file comprises at least one of determining that the data is partitioned by a predicate and determining that a constraint exists for the data.

4. The method of claim 3, wherein the method further comprises updating a historical record related to the data.

5. The method of claim 1, wherein the identifying in the query of the database the union command involving data in the database that is mutually exclusive comprises creating a constraint.

6. The method of claim 5, wherein the creating of the constraint comprises reviewing a historical record related to the query to identify a constraint candidate.

7. A device, comprising:
a server including a database; and
logic configured to:
identify, in a query of the database, a union command involving data that includes a first data set and a second data set wherein the first data set and the second data set are mutually exclusive; and
improve performance of the query by changing the union command to a union all command,
wherein the logic configured to identify a union command includes logic to determine whether a definition of the data in the first data set excludes data in the second data set and logic to determine whether the data includes a constraint for a predicate where the data is exclusive.

8. The device of claim 7, wherein the logic configured to identify in the query of the database the union command involving data in the database that is mutually exclusive comprises logic to identify a union command involving data from a partitioned file.

9. The device of claim 8, wherein the logic to identify the union command involving data from a partitioned file comprises logic to determine at least one of that the data is partitioned by a predicate, and that a constraint exists for the data.

10. The device of claim 9, wherein the logic to identify the union command involving data from a partitioned file further comprises logic to update a historical record related to the data.

11. The device of claim 7, wherein the logic configured to identify in the query of the database the union command involving data in the database that is mutually exclusive comprises logic to create a constraint.

12. The device of claim 11, wherein the logic to create the constraint comprises logic to review a historical record related to the query to identify a constraint candidate.

13. A database system, comprising:
    a server, including:
        a database; and
        historical data related to the database; and
    logic configured to:
        identify, in a query of the database, a union command involving data that includes a first data set and a second data set wherein the first data set and the second data set are mutually exclusive; and
        improve performance of the query by changing the union command to a union all command,
        wherein the logic configured to identify a union command includes logic to determine whether a definition of the data in the first data set excludes data in the second data set and logic to determine whether the data includes a constraint for a predicate where the data is exclusive.

14. The database system of claim 13, wherein the database is partitioned.

15. The database system of claim 13, wherein the logic configured to identify in the query of the database the union command involving data in the database that is mutually exclusive comprises logic to identify based on the historical data.

16. The database system of claim 13, wherein the logic configured to identify in the query of the database the union command involving data in the database that is mutually exclusive comprises logic to identify a constraint.

17. The database system of claim 13, wherein the logic configured to identify in the query of the database the union command involving data in the database that is mutually exclusive comprises logic to create a constraint.

18. The database system of claim 13, wherein the database comprises the historical data.

* * * * *